US011654407B2

(12) United States Patent
Leloup (10) Patent No.: US 11,654,407 B2
(45) Date of Patent: May 23, 2023

(54) METHOD AND DEVICE WITH INTERFACE FOR MANUFACTURING A CUSTOMISED PRODUCT

(71) Applicant: L'OREAL (SAS), Paris (FR)

(72) Inventor: David Leloup, Troyes (FR)

(73) Assignee: L'OREAL (SAS), Paris (FR)

( * ) Notice: Subject to any disclaimer, the term of this patent is extended or adjusted under 35 U.S.C. 154(b) by 538 days.

(21) Appl. No.: 16/067,068

(22) PCT Filed: Jan. 5, 2017

(86) PCT No.: PCT/FR2017/000006
§ 371 (c)(1),
(2) Date: Jun. 28, 2018

(87) PCT Pub. No.: WO2017/118803
PCT Pub. Date: Jul. 13, 2017

(65) Prior Publication Data
US 2019/0001289 A1 Jan. 3, 2019

(30) Foreign Application Priority Data
Jan. 5, 2016 (FR) ..................................... 16/00018

(51) Int. Cl.
*G06Q 30/00* (2023.01)
*B01F 33/84* (2022.01)
(Continued)

(52) U.S. Cl.
CPC ...... *B01F 33/8442* (2022.01); *B01F 25/4512* (2022.01); *B01F 33/848* (2022.01);
(Continued)

(58) Field of Classification Search
CPC .......... B01F 13/1063; B01F 2215/0031; B01F 2101/21; G06Q 30/0621
See application file for complete search history.

(56) References Cited

U.S. PATENT DOCUMENTS 8,593,634 B1  11/2013  Igarashi
2001/0047309 A1  11/2001  Bartholomew et al.
(Continued)

FOREIGN PATENT DOCUMENTS

FR  2998193  5/2014
WO  2014061989  4/2014

*Primary Examiner* — Anshu Bhatia
(74) *Attorney, Agent, or Firm* — Arrigo, Lee, Guttman & Mouta-Bellum, LLP (57) ABSTRACT

A method and device with an interface for manufacturing a customised product by mixing. The present invention concerns a device for manufacturing a customised product, and preferably a customised cosmetic product, by mixing at least two components housed in respective containers, at least one of the containers being a capsule (103), and at least one other container being a pot (11) comprising a nozzle, preferably a pump nozzle, at least one of said containers comprising an identification code, said device comprising an interface for collecting customised data, for example on a mobile phone or tablet. The invention also concerns a method for manufacturing a customised cosmetic product by homogeneously mixing components, using customised user data.

12 Claims, 8 Drawing Sheets

(51) Int. Cl.
*B01F 25/451* (2022.01)
*B01F 35/71* (2022.01)
*B01F 101/21* (2022.01)
*G06Q 30/0601* (2023.01)

(52) U.S. Cl.
CPC ........ *B01F 35/718* (2022.01); *B01F 35/7131* (2022.01); *B01F 2101/21* (2022.01); *G06Q 30/0621* (2013.01); *G06Q 30/0641* (2013.01)

(56) References Cited

U.S. PATENT DOCUMENTS

| | | |
|---|---|---|
| 2008/0311061 A1 | 12/2008 | Heuer |
| 2011/0011490 A1 | 1/2011 | Rodrigues |
| 2011/0220139 A1 | 9/2011 | Samain |
| 2013/0338821 A1* | 12/2013 | Igarashi .............. B01F 13/1061 700/233 |

* cited by examiner

METHOD AND DEVICE WITH INTERFACE FOR MANUFACTURING A CUSTOMISED PRODUCT

CROSS-REFERENCE TO RELATED APPLICATIONS

This application is a § 371 national stage entry of International Application No. PCT/FR2017/00006, filed Jan. 5, 2017, which claims priority to French Patent Application No. 16/00018, filed Jan. 5, 2016, the entire contents of which are incorporated herein by reference.

The present invention relates to a device for manufacturing a custom product, preferably a custom cosmetic product, by mixture of at least two components housed in a respective container, at least one of the containers being a capsule (103), and at least another container being a pot (11) including a nozzle, at least one of the said container carries an identification code, the said device includes a personalised data collection interface, for example on a mobile phone or a touch pad. The invention also concerns a process for manufacturing a custom cosmetic product by homogeneous mixture of components, from user's personal data.

The present invention concerns in first place a device for the manufacturing of a custom product, preferably a custom cosmetic product, by mixture of at least two components located in a respective container, at least one component being an active component contained in a capsule (103), and at least one component being a base component in a pot (11) preferably including a nozzle pump (78), at least one of the said containers carry an identification code, the device comprising

- a mixing device (51)
- a selection and dosing device (44) of at least one base component contained in a pot (11)
- a selection device (10) of at least one active component in its capsule (103)
- means of detection (12) of the said identification code
- an interface (In) of personalised data collection for the interaction with the user (Ut) to allow the user to specify its personalised data, preferably chosen from a predefined database;
- a data processing device comprising an algorithm to treat the said personalised data to automatically define the instructions of manufacturing a custom product to determine at least one, preferably all the component(s) that the custom product should contain and/or calculate quantities of the said component(s) according the said personalised data.

In a preferred embodiment according to the present invention, the interface and the data processing device are in a control unit which include a memory which stores the said personalised data and/or instructions for the manufacture of the custom product.

Preferably according to the present invention, the control unit is selected among a mobile phone, a touchscreen watch preferably connected to internet, a touch pad or a computer.

Preferably according to the present invention, the manufacturing device includes a treatment of manufacturing instructions device to recover the said instructions of custom product manufacture and communicate automatically the said instructions concerning the components and/or their quantities to the selection and dosage device (44) of at least one base component content in a pot (11).

Preferably according to the present invention, the custom product is a cosmetic product.

Preferably the components are cosmetic components.

The said at least two cosmetic components comprise in a much preferred manner:
- at least one base components, and
- at least one, two, three, four, five, or at least six active components.

By components it is intended to designate according to the present invention liquids of viscosity that can be of different viscosity within a range from 1 centipoise or 1 mPa·S (as water, for example) to 500 000 mPa·s (like butter at 10° C., viscosity measured with Brookfield DVIII Ultra, needle F, speed 1.5), as well as powders, whose maximum grain size is defined by the size of the entry orifice X and X' and the orifice 110, in a way not to obstruct them. Preferably, it is selected at least one compound in a liquid form. It may for example be a mixture of liquid paint and pigments in a powder form, a mixture of precursor of hair coloration, for example an oxidizer, a base and a coupler for a composition of hair coloration, mixture of two cosmetic foundation from different color to obtain a foundation of the desired color, mixture of a base cosmetic cream and one or more active agent(s), or also a mixture of an alimentary base sauce and a liquid aroma, or a mixture of alimentary alcohol, of a fruit juice and an alimentary syrup or liquor for a cocktail manufacture.

Advantageously according to the invention, the at least two components are at least two cosmetic components, preferably at least a base component and at least one, two, three, four, five, or at least six active components. In a preferred particular manner, the at least two components are at least a base component and at least one, two, or three active components.

By "base component", it is referred to a cosmetic component whose purpose is to bring a particular texture (cream, serum, oil, etc.) to the cosmetic product. It can be a single ingredient (for example, sweet almond oil) or several ingredients (such as water, sweet almond oil and an emulsifying agent) to obtain the said particular texture.

By "active component", it is meant a cosmetic component whose purpose is to bring at least a particular activity (anti-aging, moisturizing, antioxidant, etc.). It can be one or several active ingredients combined to obtain the said particular activity.

TECHNICAL ADVANTAGES

The device according to the invention allows to obtain within a short period, preferably less than 30 seconds, more preferably less than 15 seconds, a mixture of at least two components, preferably cosmetics components, which is perfectly homogeneous, even if it is prepared in small quantities (typically in the order of about $cm^3$ or less), with a little space used and a good robustness to wear.

Use of the capsule (103) allows a pre-dosage of components, preferably cosmetics components, in particular the active components, without manipulation of the user, a simple combination of components, preferably cosmetic, since it is sufficient to add as many capsules as we want to combine components, preferably cosmetics components, particularly active components, in its custom product preferably custom cosmetic product, and an optimal conservation of the custom product, preferably custom cosmetic product, the mixture being realised extemporaneously, preferably at the time of use.

Indeed the components, preferably cosmetics components, contained in capsules (103), in particular the active components, are protected in particular of an eventual bacterial contamination, oxidation or UV degradation.

The use of the selection and dosing device (44) including a support device (111) of pot (11) and an impulse device (45) allows to get a dosage of components, in particular base cosmetic components, without manipulation of the user, a simple combination of components, preferably cosmetics components, since it is sufficient to select the components it is wished to combine in a product, in particular base component and active component, preferably in custom cosmetic product, the device according to the invention performing automatically the dosage and the mixture of such components, with optimal conservation of the product, preferably custom product.

Thus the components, preferably cosmetics, contained in containers (11) and/or in capsules (103), are protected in particular from possible bacterial contamination by cutaneous contact, the user doesn't touch the contents of the pot (11). The use of such pot (11) and/or capsules (103) allows for example to limit or not to add chemical preservative to components contained inside, which is an advantage for the consumers looking for products without or with the least possible conservatives. Indeed these chemical conservatives are more and more rejected by consumers because of their negative side effects for the skin, questions about their harmful effects on health and/or the environment.

In particular, this device allows to realise a custom product, tailored for a user, thanks to the personalised user data collected via the interface. Advantageously, the use of a control unit able to automatically retrieve the information of the user and the environment in which he or she lives, for example, by geolocation, such as a mobile phone connected to Internet, a watch connected to internet, or a touch pad connected to internet, allowing to obtain a product in particular custom to the user. In addition, the data storage allows a monitoring of the user, of its lifestyle habits, the custom products already used and thus to propose a custom product formula and recommendations always more adapted to the said user.

Advantageously according to the invention, the custom information includes the user's age, the user's sex, the user's number of hours of sport per day or per week, the user's number of hours of sleep per night, the temperature of the environment in which the user lives, the humidity of the environment in which the user lives, the rate of pollution of the environment in which the user lives, and/or the characteristics of the user's skin.

By characteristics of the user's skin, it is intended in particular to designate according to the present invention the user's skin type (such as dry skin, greasy skin, mixed skin, or normal skin), the user's phototype of the skin, the colour of the skin, the radiance of the complexion (like dull complexion, or luminous complexion), the sensitivity of user's the skin, the presence of wrinkles and/or fine lines on the user skin, the presence of spots on the user skin, the eventual lack of firmness of the user skin, and/or the presence of dark circles and/or pockets on the eye contour area.

In a preferred embodiment, it is meant the user's age, the user's sex, the user's number of hours of sport per day or per week, the user's number of hours of sleep per night, the temperature of the environment in which the user lives, the humidity of the environment in which the user lives, the rate of pollution of the environment in which the user lives, and/or the characteristics of the user's skin.

Additionally, personalised data according to the invention include the desired beauty benefit in the case of a custom cosmetic product (such as anti-aging action, anti-spots action, skin hydration).

Mixing Device (51)

The device for the manufacture and distribution of a product, preferably custom cosmetic product according to the invention, comprises in addition of the mixing device (51), at least two containers (11, 103) each comprising respectively at least two components preferably cosmetic components. This manufacturing and distribution device advantageously includes as many containers as cosmetic components. Preferably, the active components are contained in containers (103) and the base components are contained in containers (11). Also advantageously, base components containers comprise an exit orifice.

As a mean of transfer of the component, preferably active cosmetic component, to the mixing device (51), the device according to the invention may include at least a main valve 56 able, in one of its positions, to connect a hollow needle 90 with the said mixing device (51), in one of its positions to obstruct the orifice of the mixing device (51) during the mixing phase, in another of its positions to connect cleaning channel with the mixing device (51) and at least a second main valve 56' able to provide the said product, preferably cosmetic product, to an user through a distribution nozzle.

By valves, we intend to designate according to the present invention in particular diaphragm valves, slide gate valves, pinch valves, knife gate valves or ball valves, preferably of slide gate valves.

In a preferred embodiment according to the invention, the device for the manufacture and distribution of a custom cosmetic product includes in addition a cleaning device of the said mixing device comprising
   a. a water tank connected to the orifice X, allowing entry of water into the receptacle 52 of the mixing device 51,
   b. a gutter linking the entry and exit orifice X' to a collecting tank allowing the evacuation of the water resulting from the washing from the receptacle 53.
   c. a hollow circular-shaped device Y connecting the entry orifice X to a water collecting tank resulting from the washing allowing the evacuation of the receptacle 52 of the water resulting from the washing.

In a similar manner, it will be used the terms cleaning or washing according to the present invention.

Advantageously, the cleaning water can be heated beforehand for a better cleaning, or can be replaced or added with a cleaning agent such as an antibacterial agent and/or a detergent. It can be added to the cleaning water, for example, sodium hydroxide, the device being then rinsed in an extra step with clear water.

Preferably, the mixing device (51) of the device according to the invention is characterized in that at least an entry orifice (X) is comprised in the receptacle 52 and is intended to the introduction of the at least one component preferably an active cosmetic component and at least one other entry orifice (X) is comprised in the receptacle 53 and is intended for the introduction of the at least one base cosmetic component and at the exit of the mixture obtained of at least two components, preferably cosmetic components, the said entry and exit orifice (X) being named (X').

Advantageously, the mixing device (51) according to the invention comprises a small number of orifice, allowing to limit the number of orifices to clean and the risk of occlusion. Thus, this mixing device (51) does not include a dedicated exit orifice, but one of the entry orifice (X') allows both the entry of at least one component and the exit of the obtained mixture of the at least two components.

The receptacles of the mixing device according to the invention can have varied form, cylindrical, oval, cubical, spherical, rectangular. Preferably, these receptacles are oval or cylindrical, which makes cleaning easier and allows to obtain a more homogeneous mixture.

The oval-shaped receptacles have the technical advantage of a smaller space used by the mixing device than the cylindrical shaped receptacles. They thereby allow to also obtain a manufacturing and cosmetic product distribution device with smaller space used than the one with other forms as for example a cylindrical form.

These receptacles must each have an orifice 110 and a pipe 55 linking them to allow the mixture of the at least two components. However, there is no technical constraint on the position of these receptacles with respect to each other, these receptacles can be for example either spaced, bunk, placed face to face or parallel.

In addition, the pipe 55 can be formed by a valve 57 connecting the two orifices and allowing to open and close said orifices.

According to one aspect of the invention, the receptacles of the mixing device can be flexible pockets. These pockets are preferably in flexible plastic, especially elastic.

Preferably according to the invention, the entry orifice X is comprised in the receptacle 52 and is intended for the entrance of the at least one active cosmetic component and the entry orifice X' is included in the 53 receptacle and is intended for the entrance of the at least one base cosmetic component and the exit of the mixture obtained of at the least 2 cosmetic components.

In a preferred embodiment according to the invention, said device allowing to vary alternatively the available volume of receptacles 52 and 53, preferably said pistons 50, are driven by an actuator.

Also in a specific embodiment, the mixing device according to the invention comprises at least a valve 57.

According to another mode of realisation, the mixing device according to the invention comprises at least two main valves 56 and 56' and at least one auxiliary valve 57. Preferably the valves are fitted with two bores each. Preferably, the device includes two main valves 56 and 56' and an auxiliary valve 57 with two bores each.

These at least three valves 56, 56' and 57 so pierced allow in particular to ensure the clean-up of said device without the need to add a water pump, or sprinkler powered by said water pump to bring water inside the device. It's the mixing device that will aspire itself the water necessary to its cleaning, thanks to the said valves and the piston, in a step of self-cleaning.

In a particularly preferred embodiment according to the invention, the at least 3 valves 56, 56' and 57 of the mixing device (51) according to the invention are slide gate valves, preferably of knife gate valves.

Such valves allowing to optimize the sealing of the device and get a very good sealing in particular considerably improved compared to the use of other valves conventionally used by the skilled person, in particular the floodgate valves. This improved sealing allows the step of self-cleaning of the mixing device 51, without water pump, with all the required sealing.

In particular, these slide gate valves are driven in translation, and not in rotation such as the floodgate valves.

In a preferred embodiment according to the invention, the mixing device (51) of the device according to the invention comprises an auxiliary valve 57 with at least two bores sliding in a conduit arranged in the mixing device (51) and the said valve 57 is likely to be driven in translation by a rack system 61, preferably powered by a motor 62, and able to control the flow between the said two receptacles 52 and 53.

The use of racks allows to entail the said valves in a translational movement, while allowing to maintain a minimal congestion of the said device.

Preferably, the valve 56 posses 2 bores, sliding in a pipe arranged in the mixing device, one of the bore allowing access of cleaning water, in order to penetrate the water into the mixing device 51 for the cleaning of the said device (we talk about a valve 56 in washing position), and the other bore allowing access to the hollow needle, either to introduce a component, preferably a component of active agent in said mixing device, or to extract the cleaning water by the hollow needle and thus clean it (this refers to a valve 56 in open position).

Preferably, the valve 56' has 2 bores, sliding in a pipe arranged in the mixing device, one of the bore allowing access to the component, preferably the base component, and the other bore allowing access to the supply nozzle of the product there from obtained by mixture, preferably the custom cosmetic product.

Selection Device (10) of at Lease One Component in its Capsule (103)

Advantageously, the selection device (10)
is rotating around an axis (7),
is preferably circular or hemi-circular,
includes at least one, two, three, four, five, or at least six location(s) (Y) that can lodge each a capsule (103),
includes a security door (Z) with an orifice (1) allowing the insertion of capsule (103) in the selection device (10) when orifice (1) is in front of location (Y) then, after rotation, preventing the insertion of capsule (103) in the selection device (10) when orifice (1) is not in front of a location In a preferred embodiment according to the present invention, the mixing device (51) includes a components sampling system (90), preferably cosmetics, in the capsule (103), and a components transfer device, preferably cosmetic, to the mixing device (51).

Advantageously, the sampling device and the transfer device may be a single device. Particularly preferably, the said sampling device (90) comprises a hollow needle and a component suction mean, preferably cosmetic, through the said hollow needle.

Advantageously, the said hollow needle is incorporated into the mixing device (51) and the aspiration mean is the piston (50) of the mixing device, allowing to transfer directly component, preferably cosmetic, from the capsule (103) to the mixing device (51) passing through the hollow needle, which is then used as sampling and transfer device Particularly preferably, the mixing device (51) may include a main valve suitable, in one of its positions, to connect the said hollow needle (90) with the mixing device (51), and in one of its positions to obstruct the orifice of the mixing device (51) during the mixing phase.

By means of aspiration, we intend to designate according to the present invention a device allowing to vary the volume available in the receptacle of the mixing device (51) in order to draw the contents of the capsule (103) and distribute it in the mixing device, such as a motor driven piston, preferably the piston (50) of the mixing device (51). By hollow needle it is intended to designate according to the present invention a hollow needle able to pierce the capsule (103).

Advantageously according to the present invention, the mixing device (51) is placed on a cart (88) that can move, preferably slide, on rails (5) in a horizontal translational movement of back and forth relative to selection the device (10). Preferably, the cart (88) is connected to a motor to be able to move.

Advantageously, the product manufacturing device, preferably cosmetics, custom according to the present invention comprises in addition a container (P) to collect the capsules (103) after use. Preferably, this container (P) is removable of the said device in order to easily empty its contents, namely the used capsules, for example with waste.

Advantageously, the mixing device (51) comprises an orifice (X') for the component in the said mixing device (51), the said orifice (X') can be put in contact in a tight way with at least a pot (11).

Selection and Dosing Device (44) of at Least One Component in a Pot (11).

Preferably, the device according to the present invention is characterized in that

- the selection and dosing device (44) comprises a device (111) of pot rack (11) presenting itself in the form of a container, preferably cylindrical, able to accommodate at least one, two, three, four, five or at least six pots (11), preferably 3 pots (11), the said device (111) of pot rack (11) including a slot (F) for each pot (11), located on the side of the container (111) and allowing to initiate a retractable thrust (B).
- the selection and dosing device (44) includes an impulse device (45) placed in contact and under the pot rack device (111) and occurring preferably as a circular wheel presenting a slope (16) for each pot (11) that the pot rack (111) accommodate;
- the selection and dosing device (44) includes a retractable thrust (B) placed in front of the container (111) that can either be retracted into the device (44), or engage into the slot (F) corresponding to the chosen pot (11), allowing to the pot rack) (111), when the said thrust is engaged in the slot (F) of the chosen pot (11) to follow the slope (16), and thus to put in contact the chosen pot (11) with the mixing device (51) and bring to the mixing device (51) a dose of the component contained in the chosen pot (11);
- the device (111) of pot rack (11) and the impulse device (45) are positioned one on the other and rotating together around an axis (8).

Advantageously, the pot rack device (111) and the impulse device (45) can be set in rotation using a motor in one and in the other direction.

The nozzle pump (78) on the pot (11) is the exit orifice of the component in the pot (11) and allows, when engaged in the orifice (X') of the mixing device (51) to deliver a dose of component contained in the said pot (11). According to one embodiment, the dose of component is delivered after the engagement into the orifice (X') by pressure of the pot (11) and so the nozzle pump (78) in the said orifice (X'), named impulse.

The volume of custom product, preferably cosmetic product, obtained by the invention may be for one dose for one use, for example immediately by the user, or multiple doses, for multiple uses, in this case the product may be stored in a container by the consumer.

In the case where the volume of cosmetic product is one dose, it will be typically a volume in the order of ml, and in the particular case of a cosmetic products for a face use, a volume of about 1 ml.

In this case of figure of a volume of cosmetic product of 1 ml, the component dose, that is the volume of component, delivered by the device for each impulse by the impulse device (45) may be in the order of 0.2 ml, it will be beneficial to realise at least 2 to 5, advantageously 2 to 3 impulses.

Advantageously, the device of the present invention is characterized in that component in the chosen pot (11) is brought to the mixing device (51) by impulse, preferably by pressure of the nozzle pump (78) of the pot (11) with the entry (X') of the mixing device (51).

Preferably the device according to the present invention includes at least another container likely to bring another component to the mixing device (51), preferably a capsule (103). The said capsule (103) preferably contains preferably an active component.

In particularly preferred embodiment, the custom product is a cosmetic product and the components are cosmetic components, preferably in that the cosmetic component(s) contained in the pot (s) (11) are base components, and the component (s) contained in the capsule (s) (103) are active components.

Interface

In a specific embodiment, the device according to the invention includes an interface that can be connected to a data processing device and to a mean of control, said interface allows the user to select at least one component of the custom cosmetic product, preferably at least one active component, preferably all the active components, again preferably all components contained in the custom product.

By data collection interface (In) we intend to designated according to the present invention an interface, preferably an informatic interface that allows to an user or a third party on behalf of the user, to inform its personalised data which will be recorded and/or transferred, for example from a database, to a data processing device.

Interface (In) according to the present invention may consists for example of a touch screen, a display, a monitor, a display screen keyboard, a bar code reader, a light pen, of a speech recognition system, a keyboard, a mouse or similar or other peripheral equipment.

Advantageously according to the invention, the interface (In) can be connected to a computer network, which can for example take the form of a computer server (Sv), physically connected to the interface or connected via Internet (Cl) (also called virtual server or server in the Cloud), allowing in particular a regular update of the interface, and in particular of the database, and/or to transmit remotely the instructions for a custom product manufacture for example to a custom product manufacturing device (Ma).

By data processing device it is intended to designated according to the present invention an automated processing system of preference data collected through the interface according to the present invention. This data processing device may comprise in particular one or several treatment units, memory, software, one or more data base according to the invention. Preferably the software allows to apply the algorithm of the method according to the present invention.

The data processing device may comprise, preferably a computer. By computer we also mean any electronic device able of perform the automated processing of data collected by the interface according to the present invention.

Advantageously according to the invention, the data processing device can be connected to a computer network, a server, in particular a virtual server (called server in the Cloud) or the Internet, allowing in particular a regular update for example of the software, and/or to remotely transmit the custom product manufacture instructions.

Advantageously according to the invention, the data collection interface and the data processing device can be included in the same device (for example a touchpad, a mobile phone or a computer).

Advantageously, the custom product manufacturing device according to the present invention may comprise one device combining an interface and a data processing device (said back-end), and/or a second data treatment device on a server in the Cloud, the choice of the data processing device with which the interface must interact among the two "back-end" devices or "server in the Cloud" being made according to the number of data to be analysed, in particular according to the number of information informed by the user.

Advantageously, the data processing device comprises an algorithm to process the data entered by the user in the interface (such as for example choice of the base component), or the choice of the active component based on the capsule (103) inserted in the device, by identification code recognition, in order to automatically define the suitable components for the custom product manufacture and calculate the quantities of each component in function of the said data. The device includes preferably at least one computer.

Advantageously, the said information or data may be obtained directly from the user, for example through a questionnaire, or automatically by collecting information from one or more of the connected object used by the said user, such as a mobile phone or a watch connected to internet, allowing for example to recover data from physical activity performed by the user in the day, or even the temperature, the humidity, or even the pollution rate of the place where the user is located following its Geolocation.

Advantageously, the interface includes buttons placed on the manufacturing device (Ma), preferably 3 backlight buttons, allowing to select the chosen component. As part of a cosmetic product, it can for example be to select the chosen base component, such as a base serum, a base emulsion oil in water or a water emulsion in oil.

Advantageously, the said interface, preferably on mobile phone, touchpad or computer, is also able to display the levels of cosmetic components, in particular the base components, for example by counting the number of impulse achieved on each container (11) and therefore the number of doses already delivered by the container (11).

Identification Code and Means of Detection (12)

The identification code(s) used in the context of the present invention may be all identification code known of the general knowledge of the skilled person such as colour codes, RFID chips, bar codes, QR code. The means of detection of the said identification code are adapted to the identification code chosen. Preferably, the identification code according to the present invention is a colour code and the mean of detection is an optical mean.

Method

A second object of the present invention concerns the manufacturing method of a custom cosmetic product for a user, the said method using a device according to the present invention, and comprising the following steps:
  a. Collect the personalised data of the said user by an interface of personalised data collection;
  b. Treat the said personalised data with an algorithm to automatically define the components, preferably active components and/or base components, of the custom product and calculate the quantities of each component in function of personalised data collected in step a)
  c. Provide custom products formula for the said user.
  d. Optionally sending of the said proposition of custom products formula to an automated cosmetic product manufacturing device, preferably connected via internet;
  e. Sampling of each component defined in step b) of the said formula from its container to deliver it in a mixing device;
  f. Mixing of the said components in the mixing device;
  g. Obtention of the custom cosmetic product for a user.

Advantageously according to the present invention, the active component(s) of the custom product formula and their quantity is (are) defined by a number of capsules (103) and type of capsule (103) according to the component they contain, to insert in the selection device (10).

Advantageously according to the present invention, the dose of base component(s) of the custom product formula is defined by the number of impulse delivered by the selection and dosing device (44) on the nozzle pump (78) of the pot (11).

Advantageously according to the present invention, the step c) of provision of custom product formula for the said user consists of indicating to the user which capsule(s) (103) of active component to bring to the mixing device (51) at step e), the said capsule having an identification code, preferably a colour identification code, which when will be detected by means of detection (12) will communicate automatically to the selection and dosing device (44) which base component sample into the pot (11) corresponding to the step e), and in which quantity.

Advantageously according to the present invention, step e) of the method according to the present invention includes the following steps:
  I) bring to the mixing device (51) at least one component contained in a pot (11) by the following steps:
    a) Bring by rotation of the device (111) and (45) around the axis 8 the pot (11) placed on the pot rack device (111) so that the chosen pot (11) is in front of the entry orifice (X') of the mixing device (51)
    b) Spin the devices (111) and (45) by rotation around the axis (8) in the opposite direction of the step a) so that the slot (F) corresponding to the chosen pot (11) engage itself into the retractable thrust (B) allowing to the support of pot (111), when such thrust is engaged in the slot (F) of the chosen pot (11) to follow the slope (16) of the pot chosen (11), and so to put in contact the pot chosen (11) with the mixing device (51) and bring to the mixing device (51), preferably in the receptacle (53), a dose of the component in the chosen pot (11) by pressure of the nozzle pump (78) of the pot (11) with an orifice (X') of the mixing device (51);
    c) Optionally repeat steps a) and b) as many times as it is wanted to bring dose of the component from the chosen pot (11);
    d) Channel through the movement of the device allowing to vary alternately the available volume of the receptacles 52 and 53, preferably by the movement of the piston 50 the said base cosmetic component of the receptacle 53 to the receptacle 52 by a conduit 55 linking the two orifices 110;
    e) perform a degassing of the receptacle 52 by a movement of the device allowing to vary alternatively the available volume of the receptacles 52 and 53, preferably by a movement of the piston 50 in such way to evacuate the air located into the receptacle 52 by orifice X;
  II) bring to the mixing device (51), preferably in the receptacle 52 through the orifice (X), at least a component contained in a capsule (103) by the following steps:
    f) Place the orifice (1) of the safety door (Z) in front of a location (Y) of the selection device (10),
    g) Inserted a capsule (103) containing a component through the orifice (1) till the location (Y) located in front of the said orifice (1), h) Place by rotating the selection device (10) the inserted capsule (103), in front of the mixing device (51), preferably in front of the sampling device (90), i) To move the mixing device (51) on the cart (88) by a forward horizontal translation till the capsule (103) located in location (Y) of the selection device 10, j) To move the component from the capsule (103) to the mixing device (51), preferably to the receptacle (52) through the orifice (X)

k) To move the mixing device 51 on the cart (88) by forward horizontal translation, in order that it is no more in contact with the capsule (103);

l) (Optionally repeat steps e) to j) to bring to the mixing device (51), preferably in the receptacle 52 through the orifice (X), another component contained in another capsule (103);

Phase I may be realised before phase II, or vice versa;

Advantageously according to the present invention, the step f) of the method according to the present invention includes the following steps:

III) To realise the mixture of the said at least two components in the said mixing device (51) by the following steps:

a) achieve a homogeneous cosmetic components mixture by activating the motor 62 to bring alternatively, through the device movement allowing to vary the volume of available receptacles 52 and 53, preferably by the opposite movement of the pistons 50, components of the receptacles 52 and 53 by the conduit 55 linking the two orifices 110, ending with the said cosmetic components mixture into the receptacle 53;

b) distribute the cosmetic product thus manufactured to the user by a movement of the device allowing to vary alternatively the available volume of receptacles 52 and 53, preferably by the movement of the piston 50 in such way to evacuate the cosmetic product by the orifice X' to the user;

c) Optionally wash the mixing device by a step of cleaning, the at least one pot (11) and/or the least one capsule (103) presenting an identification code, preferably a colour code, and the number of dose of the component contained in the said pot (11) brought during step I and/or the type and/or the number of capsules (103) that can be brought in step II according to the detected identification code(s).

Advantageously, the steps I and/or II of the process according to the present invention are repeated as many times as it is wanted to add component for the custom product manufacture, before making the step III.

In one particular embodiment, the process according to the invention also includes the step of:

Select, beforehand, on the device according to the invention, the desired product, preferably cosmetic, then only bring to the said mixing device (51) said at least two components, preferably cosmetic, presenting the selected identification codes by the said device.

In a particular implementation, the said identification code is a colour code and the detection is performed by optical means.

The said at least two cosmetic components comprises:
at least one base components, and
at least one, two, three, four, five, or at least six active components.
or if at least one of the active components is likely to be incompatible with at least one of the base components, the said process includes the step to lock the mixing operation if the codes for the identification of at least one base component and at least one active component and/or at least 2 active components are incompatible.

The volume of custom cosmetic product obtained by the invention can be for one dose for one use, for example immediately by the user, or multiple doses, for multiple uses, in this case the product may be stored in a container by the consumer. In the case where the volume of cosmetic product is one dose, it will be typically a volume in the order of ml, and in the particular case of a cosmetic products for a face use, a volume of about 1 ml. In this case of figure of a volume of cosmetic product of 1 ml, the volume of the pipe 55 in the valve 57 can be about 0.05 ml, and it will be advantageous to realise at least 3, advantageously 3 to 6, back and forth of the cosmetic components between the receptacles 52 and 53 (by operating the motor 62 so that to bring alternatively, through the device movement allowing to vary alternatively the available volume of receptacles 52 and 53, preferably by the opposite movement of the pistons 50, the components of receptacles 52 and 53 through the pipe 55 linking the two orifices 110) in order to achieve a homogeneous mixture of the cosmetic components.

Advantageously, the process for the manufacture by mixture of at least two cosmetic components and the distribution of a custom cosmetic product, comprise steps consisting in:

Put the valve 56' in open position using the motor 62 so as to bring to a mixing device 51 at least a base cosmetic component into the receptacle 53 through orifice X'; put the valve 56' in the closed position using the motor 62 allowing to close orifice X';

put the valve 57 in the open position using the motor 62, to open the two orifices 110;

Operate the motor 62 in order to channel by the movement of the device allowing to vary alternately the available volume of the receptacles 52 and 53, preferably by the movement of the piston 50 the said base cosmetic component of the receptacle 53 to the receptacle 52 by the pipe 55 linking the two orifices 110;

put the valve 57 in the closed position using the motor 62, to close the two orifices 110;

put the valve 56 in open position using the motor 62 to open the orifice X and perform a degassing of the receptacle 52 by a movement of the device allowing to vary alternately the volume available to the receptacles 52 and 53, preferably by a movement of the piston 50 in order to evacuate the air in the receptacle 52 by the orifice X;

bring to the said mixing device 51 at least an active cosmetic component into the receptacle 52 through the orifice X with the valve 56 in open position using the motor 62;

bring the valves 56 and 56' in the closed position using the motor 62 to close the orifices X and X';

bring the valve 57 in the open position using the motor 62 to open orifice 110 and pipe 55 achieve a homogeneous cosmetic component using the motor 62 to channel alternatively, through the movement of the device allowing to vary alternately the available volume of receptacle 52 and 53, preferably by the opposite movement of the pistons 50, components of the receptacles 52 and 53 by the pipe 55 linking the two orifices 110, ending with the said mixture of cosmetic components in the receptacle 53;

bring the valve 57 in the closed position and bring the valves 56' in open position using the motor 62 to open the orifice X';

distribute the cosmetic product thus manufactured to the user by a movement of the device allowing to vary alternatively the volume available of receptacles 52 and 53, preferably by the movement of the piston 50 in such way to evacuate the said cosmetic product by the orifice X' to the user;

Optionally wash the mixing device by a step of cleaning.

Advantageously, the cleaning step of the process includes the following steps:

a first step of washing of the receptacles 52 and 53, orifices X and X', from the inside of the valves 56 and 56' and of the pipe 55 preferably included in the valve 57 comprising the following steps:

put the valve in washing position 56 using the motor 62, allowing the orifice X to be in the front of the washing water tank;

aspire through the orifice X until the receptacle 52 the water located in the washing water tank;

put the valve 56 in the closed position, put the auxiliary valve 57 in open position using the motor 62, operate the motor in order to channel alternatively, water by the movement of the device allowing to vary alternatively the available volume of the receptacles 52 and 53, preferably by the opposite movement of the pistons 50, of receptacles 52 to 53, by the pipe 55, preferably included in the valve 57 linking the two orifices 110, then finish with the cleaning water into the receptacle 53, put the valve 57 in the closed position to close orifice 110 put the valve 56' in the open position evacuate the water resulting from the washing through the orifice X' to a collecting tank;

a second step of washing of the receptacle 52, of the orifice X and the inside and the outside of the hollow needle 90 comprising the following steps:

put the valve 57 in the closed position to close orifices 110;

put the valve 56 in washing position using the motor 62, allowing the orifice X of being connected to the washing water tank;

aspire the water located in the washing water tank through the orifice X to the receptacle 52;

put the valve 56 in the open position, allowing the orifice X to be linked to the hollow needle 90;

insert the hollow needle 90 in the hollow circular-shaped device Y linking the orifice X to a tank collecting water evacuate the water by the orifice X and the hollow needle 90 through the hollow circular-shaped device Y allowing to clean the orifice X then the inside of the hollow needle 90, then the outside of the hollow needle 90, the water returning into the device Y on the outside of the hollow needle 90 before its evacuation to a collecting tank of water resulting from the washing

FIGURES LEGEND

The FIG. 1 is a front view of the mixing device 51 without the pistons.

The FIG. 2 is a rear view of the mixing device 51.

The FIG. 2' is a rear view ¾ of the mixing device 51.

The FIGS. 3 and 3' represent the main valves 56 and 56' and an auxiliary valve 57, front face (FIG. 3) and rear face (FIG. 3'). It can be distinguished on FIG. 3, valve 56, the open positions allowing access of the cosmetic component into the receptacle 52, and the washing position allowing access to the cleaning water.

The FIG. 4 represents, in perspective, the whole mixing device in front panel, the pistons and the receptacles 52 and 53 being represented transparently.

The FIG. 5 represents, in perspective, the whole mixing device in rear panel.

The FIG. 6 represents the circular hollow device for cleaning (presented in horizontal cut at the top of the photo, presented closed such as used in the device according to the invention at the bottom of the photo). It can see on the left the nozzle allowing to insert the hollow needle 90 and with the white arrow the path of the water inside the device Y allowing to clean the inside of the hollow needle 90, then by going through again after the curve, the outside of the hollow needle 90 (at the position where the white arrows cross itself).

The FIG. 7 represents the circular hollow device for cleaning with the hollow needle inserted inside, in cleaning position (Y presented closed such as used in the device according to the invention at the bottom of the photo).

The FIG. 8 represents the circular hollow device for cleaning with the hollow needle inserted inside, in the position of cleaning (presented in horizontal cut. It can be distinguished the hollow needle 90 inside the device Y).

The FIG. 9 is a perspective view of the manufacturing device with a lead represented transparently in order to be able to visualize the internal organs of the device.

The FIG. 10 is a vertical section view of the manufacturing device.

Figure 9:
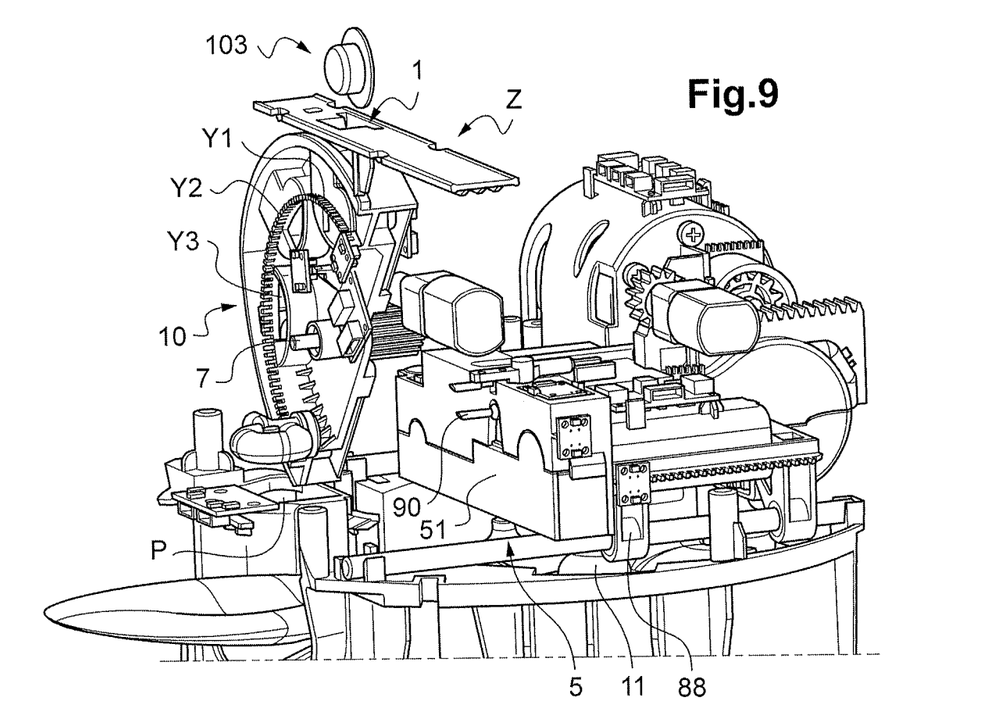
Figure 10:
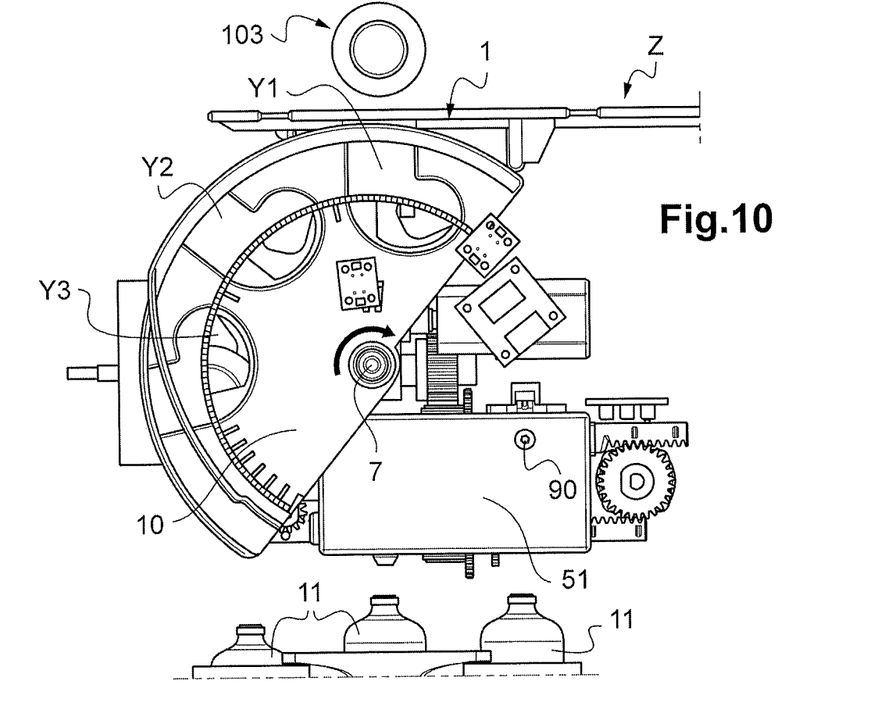

These figures show an orifice (1) in a shape of capsule for the introduction of one, two or three capsules (103) of active component, in one of the 3 location Y (Y1, Y2 and Y3) of the selection device (10) (on the figures, the capsule (103) will move in the location Y1, the higher, located in front of the orifice (1)). These capsules contain each an active component which will be sampled by the hollow needle (90) then will be mixed using the mixing device (51) with one or more base components in containers (11) installed in the device by the user.

In FIG. 9, it can be seen the cart (88) on which is placed the Mixing device (51) that moves forward horizontally (on FIG. 9, this results in a movement to the left towards the selection device (10)) on rails (5), then backward in order to regain its initial position as shown on FIG. 9.

It will be now described the sequence of operation of the device, particularly with reference to FIGS. 9 and 10.

The first phase of the process is to introduce a capsule of active component in orifice 1 to the location (Y1).

Figure 2:
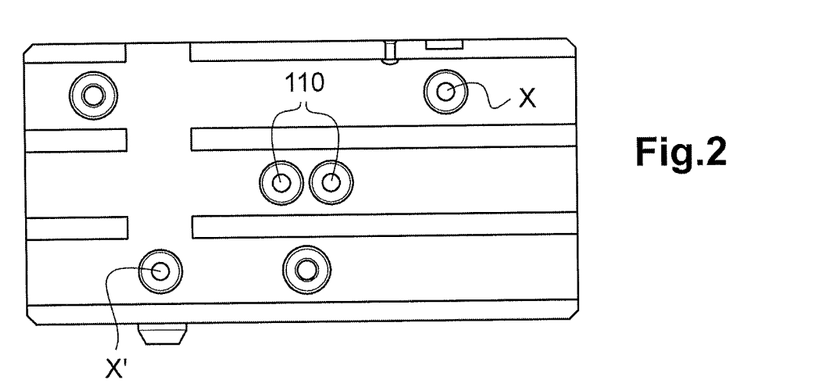
Figure 3:
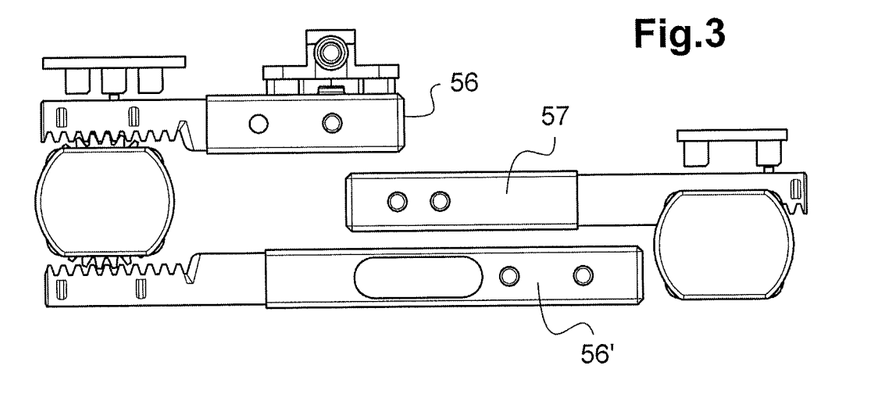
Figure 4:
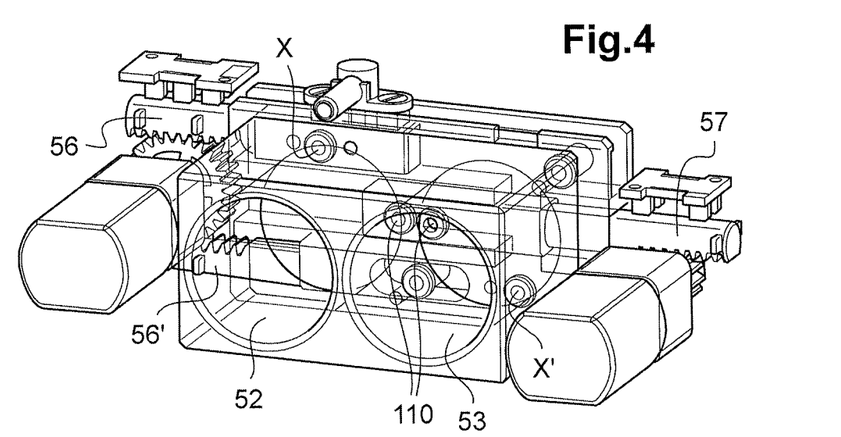
Figure 5:
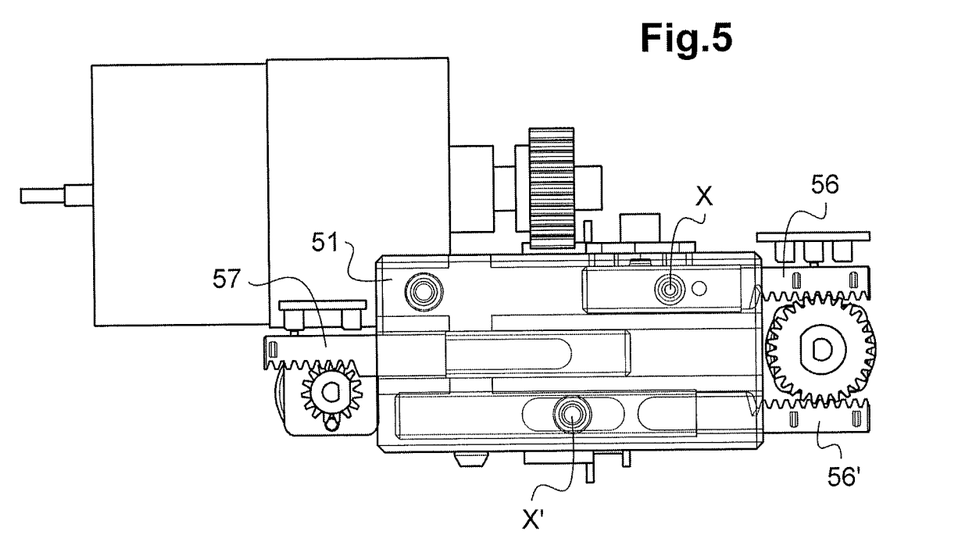
Figure 6:
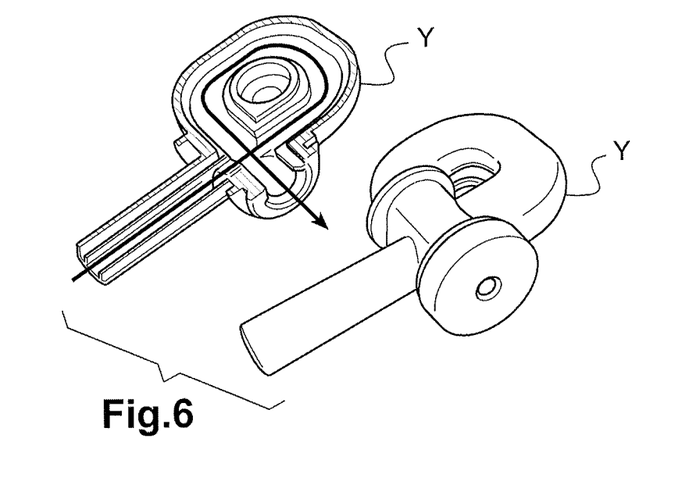
Figure 7:
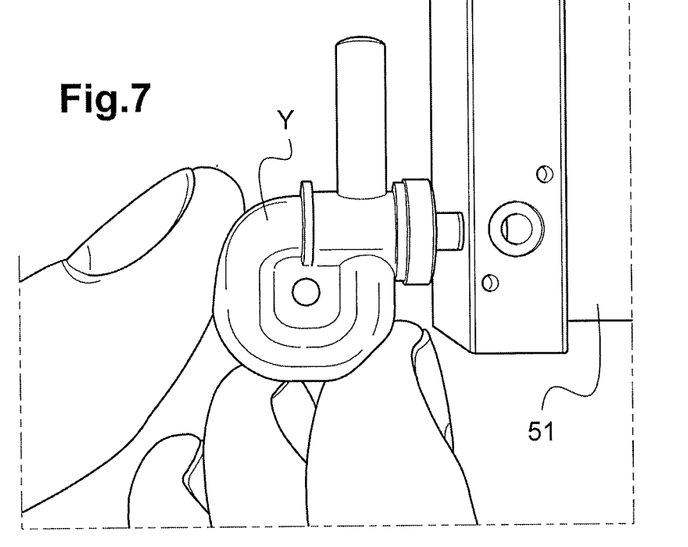
Figure 8:
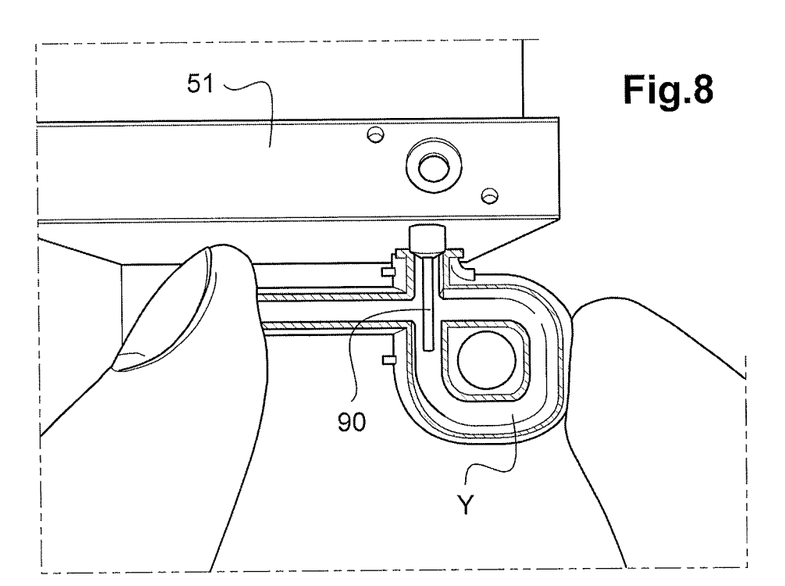

In a first step, the selection device (10) will rotate clockwise around an axis (7) in such way to position itself in location (Y1) loaded know with a capsule (103) facing a hollow needle (90) of the mixing device (51): in FIG. 2 we observe that one rotation of about 90 degrees in a clockwise allows to obtain such result.

Figure 1:
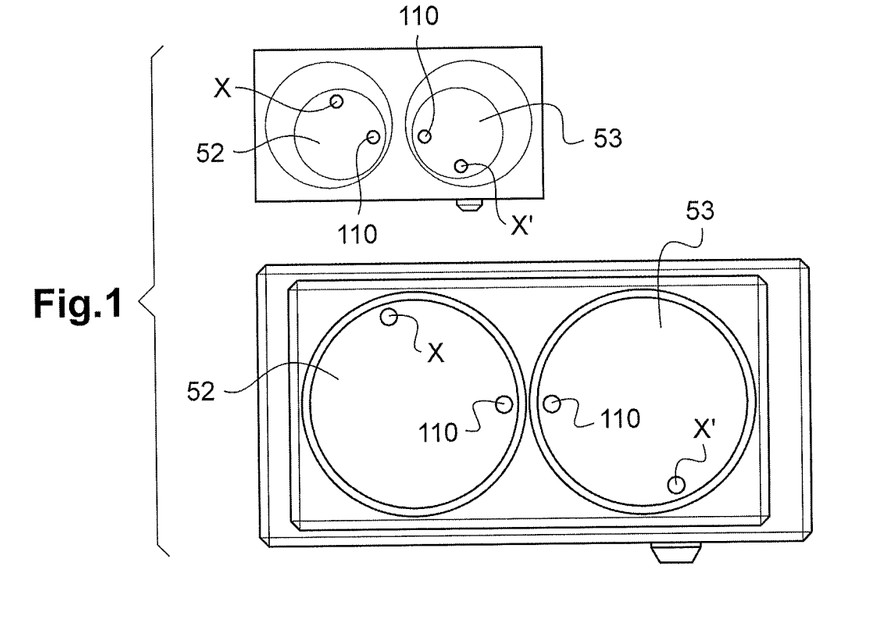

In a second step, the cart (88) on which is placed the mixing device (51) moves forward horizontally thanks to the motor (in FIG. 1 it results in movement to the left towards the selection device (10)) on the rails (5) until the hollow needle (90) pierces the capsule (103) in the location (Y1) and aspire by means of aspiration (piston) the active component present in the capsule and transfers it the mixing device (51).

In a third step, the cart (88) on which is placed the mixing device (51) moves backward horizontally thanks to the motor (in FIG. 9, this results in movement to the right towards the selection device (10)) on the rails (5) until the cart and the mixing device regain its original place, such as shown in FIG. 9.

Optionally, the user can add a new cosmetic component, preferably one active component by inserting a new capsule (103) in the selection device (10) through the orifice (1) placed in front of the location (Y2) thanks to the rotation of the said selection device. The user can then repeat the first phase of the process with a second active component capsule, location Y2 replacing the location Y1.

Likewise optionally, a third capsule can be added into the location Y3 by rotation of the selection device (10) until it face the orifice (1).

The capsule(s) so used are then evacuated to a waste compartment by rotation of the selection device (10) until the location (Y) in which a used capsule is located in a position where the capsule falls by gravity (in FIG. 10 this position will be obtained for example by a 225 degree clockwise rotation), where it can be collect in a waste container. Advantageously, once the content of the capsules (103) transferred into the mixing device (51), the selection device returns to its starting position, such as presented in FIGS. 9 and 10, namely with the location (Y1) in front of the orifice (1), by a rotation, clockwise rotation for example, which will automatically position the locations (Y1), then (Y2) then (Y3) in a position where the capsule falls by gravity into the waste container.

In a second phase of the process, the base component container (11) delivers a dose of base component in the mixing device (51) thanks to a collecting and transfer mean.

The third phase of the process consists to mix the base components and the active components in the mixing device (51).

The fourth phase of the process consists to distribute the product thus manufactured to the user.

At the end of the cycle, a cleaning of the device is performed by a cleaning fluid that may be water. The cleaning liquid is then collected in the waste container.

Figures 11, 12, 13:
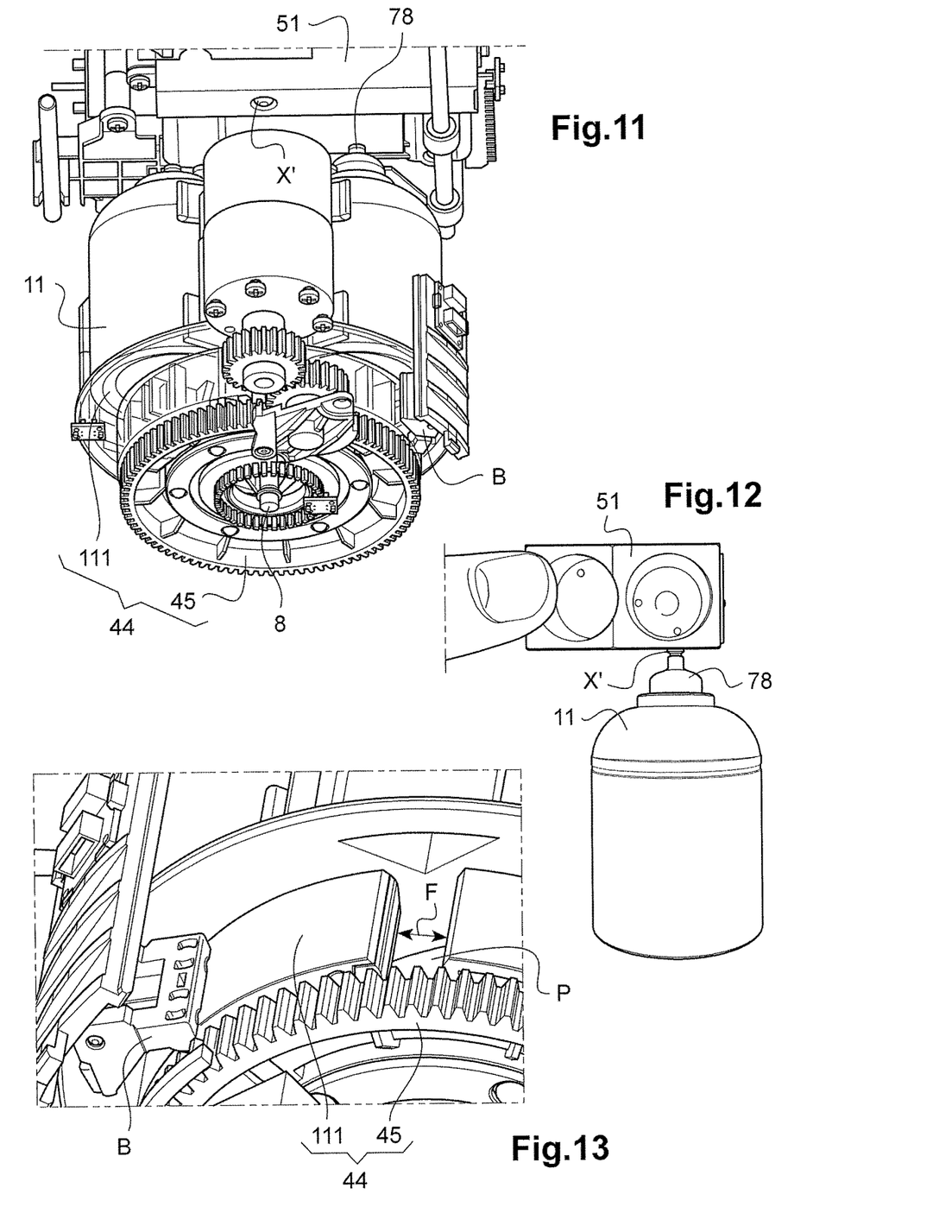

The FIG. 11 is a perspective view of the below ¾ of the manufacturing device with a lead represented transparently in order to be able to visualise the internal organs of the device.

The FIG. 12 is a front view of the mixing device (51) in which the nozzle pump of a pot (11) is engaged into the orifice (X').

The FIG. 13 is a detailed view of the retractable thrust (B), of the impulse device (45) placed under the support device (111) of pot and a slot (F) on the said support device (111). Notice that through clockwise rotation around the axis (so to the right) the devices (45) and (111), so the retractable thrust (B) is retracted and the device (111) can turn freely. In contrary, it can be noticed that by putting the devices (45) and (111) in anti-clockwise rotation around the axis (so to the left), so the retractable thrust (B) will engage in the slot (F) and the device (111) will then follow the slope (16) and will put the pot (11) in contact with the mixing device (51).

Figure 14:
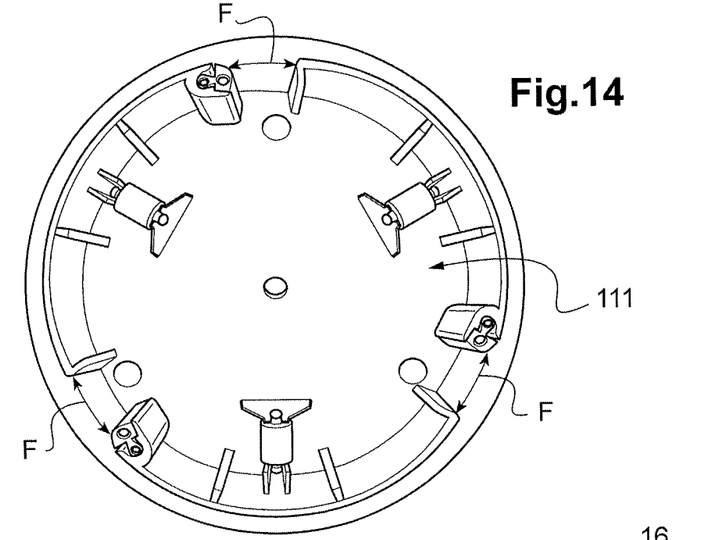

The FIG. 14 is a bottom view of the support device (111) of the pot (11) able to contain 3 pots (11). We distinguish 3 Slot (F) corresponding to the 3 pots (11) where we will be able to engage the retractable thrust (B).

Figures 15, 16:
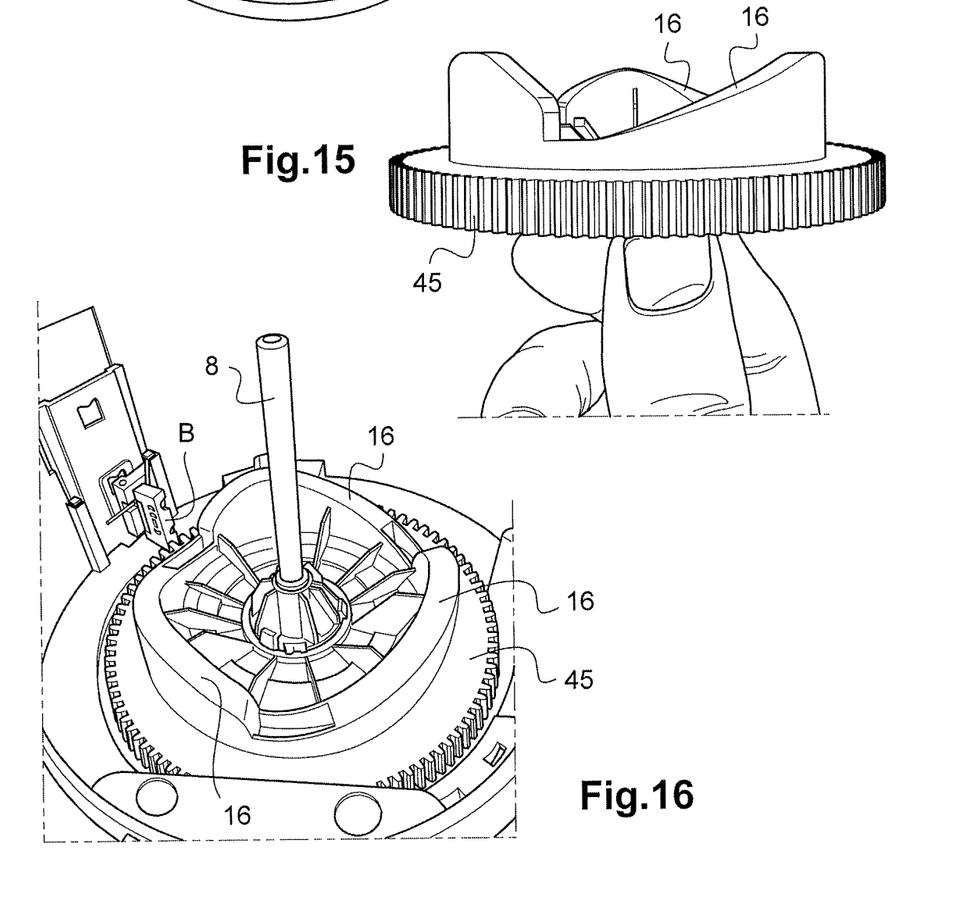

The FIG. 15 view of the side of the impulse device (45) with 3 slopes (16). As it can be seen, the impulse device (45) is toothed in order to be driven more easily by a motor into rotation around the axis (8).

FIG. 16 is a top view of the impulse device (45) with 3 slopes (16). As you can see, the impulse device (45) is toothed in order to be driven more easily by a motor to enter in rotation around the axis (8).

Figure 17:
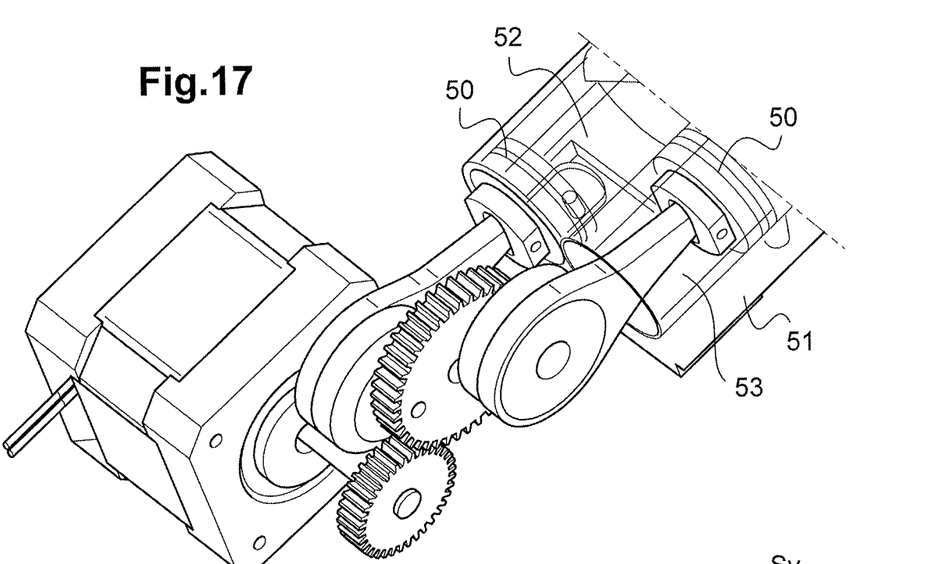

FIG. 17 is a view of the mixing device (51) and the pistons (50) in action, the piston (50).

Figure 18:
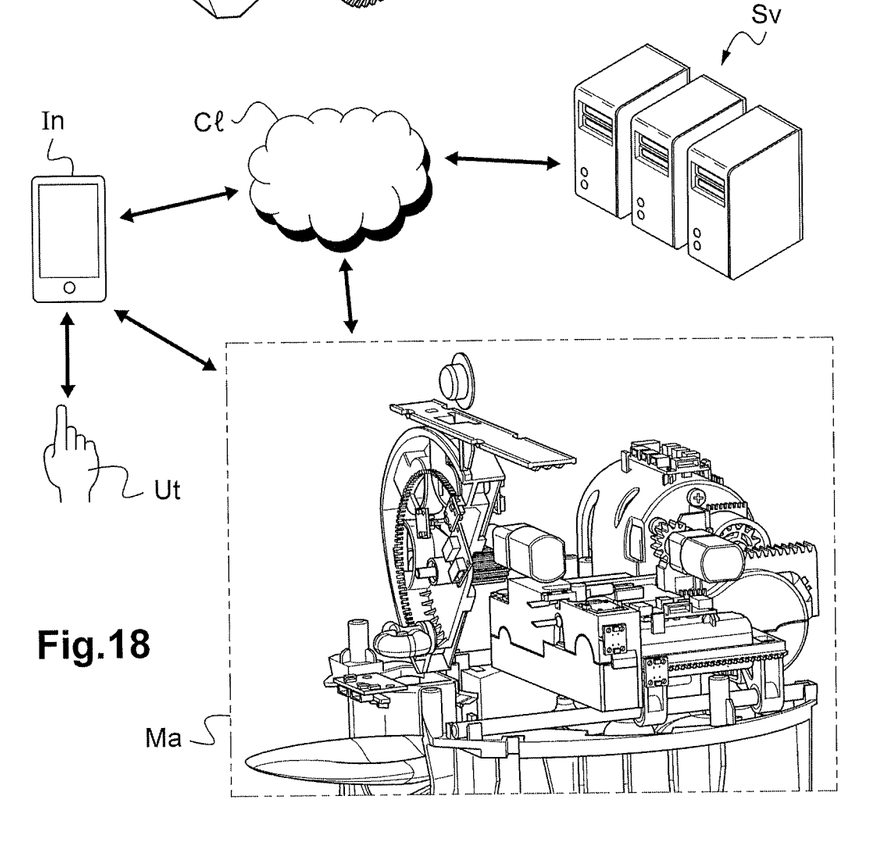

FIG. 18 represents the interface (In) functioning with the custom product manufacturing device according to the invention (Ma), through the action of a user (Ut) on the said interface to enter personalised data.

It will be described now, as a non limiting exemple, an embodiment of the invention with reference to the schematic drawings attached in which:

1—The user indicates on the interface of his cellphone the following personalised data:
  i. Gender: Female
  ii. Skin Type: dry
  iii. Presence of wrinkles on the skin
2—the algorithm defines a custom product formula with a capsule (103), containing an anti-aging active agent.
3—The user inserts a capsule (103) comprising an anti-aging active component, through orifice (1) of the security door (Z) till the location (Y1) of the selection device (10), the device detects its type through thanks to the optical detection mean of colour identification code carried by the capsule
4—After inserting one or the capsules (103), the user press a touch of the interface on the device to launch the selection and dosing of the base component, by choosing for example an emulsion oil in water, in particular suitable for dry skin.
5—The selection and dosing device (44) of at least one base component in a pot (11) presents the correct pot (11) in front of the orifice (X'), and realize the serie of impulses to deliver the dose of base component to the capsule (103) detected to have ultimately a care of the desired dose, for example 1 ml for a cosmetic face treatment utilisation. During this stage the mixing device (51) is in a specific «base component receiving» position.
6—Then the selection device (10) presents one or the capsules in front of the hollow needle (90) to be hit and aspirate by the mixing device (51). During this stage the mixing device is in a specific «active component aspiration» position.
7—The mixing device (51) put itself in "mixing" position, and in function of base component inserted, the mixing device (51) realizes a different number of back and forth between the two receptacles 52 and 53.
8—The mixing device (51) brings the custom product thus obtained by mixing into the receptacle (53). The cart moves the mixing device (51) above a reception of the finished product receptacle and the mixing device (51) distributes the said product in the said reception receptacle. In particular, the device can detect the absence of reception receptacle and not deliver the said product as long as the said receptacle is not in a receiving position of the product.
9—After having distributed the product, the mixing device (51) enters in a wash cycle. The valves put themselves in a position to aspirate the washing water. And specific cycles allow, one time the washing of the interior and exterior of the needle, and in another cycle, the washing of the final product exit.

The invention claimed is:

1. A device for the manufacturing of a custom product by mixture of at least two components located in a respective container, at least one component being an active component contained in a capsule, and at least one component being a base component in a pot including a nozzle pump, at least one of the said containers comprising an identification code, the device comprising:
- a mixing device;
- a selection and dosing device of at least one base component contained in a pot;
- a selection device of at least one active component in its capsule;
- means of detection of the said identification code;
- an interface configured to collect personalised data related to a user; and;
- a data processing device configured to process the personalised data using an algorithm to output instructions for manufacturing a custom product, the instructions comprising:
  - an identity of at least one encapsulated active component to be included in the custom product, and
  - a quantity of at least one component to be included in the custom product, wherein the active components that are in capsules are loaded into the selection device in one or more individual capsules, wherein the number and identity of each capsule are determined on the basis of the personalised data.

2. The device according to claim 1, wherein the interface and the data processing device are in a control unit comprising a memory which stores at least one of the personalised data or the instructions for the manufacture of the custom product.

3. The device according to claim 2, wherein the control unit is selected among a mobile phone, a touch pad, a touchscreen watch or a computer.

4. The device according to claim 1, wherein further comprising a treatment of manufacturing instructions device to recover the instructions of custom product manufacture and communicate automatically the instructions concerning the components and/or their quantities to the selection and dosage device of at least one base component contained within a pot.

5. The device according to 1, wherein the custom product is a cosmetic product.

6. The device according to claim 5 wherein the personalised data comprises the user's age, the user's sex, the user's number of hours of sport per day or per week, the user's number of hours of sleep per night, the temperature of the environment in which the user lives, the humidity of the environment in which the user lives, the rate of pollution of the environment in which the user lives, and/or the characteristics of the user's skin.

7. The device according to claim 1, wherein the mixing device comprises a receptacle comprising at least one entry orifice for the introduction of at least one active component and at least one other entry orifice for the introduction of at least one base component, and wherein the said at least one orifice for the introduction of at least one base component is also used as an exit orifice for the mixture of the active and base components.

8. The device according to claim 2, wherein the mixing device comprises a receptacle comprising at least one entry orifice for the introduction of at least one active component and at least one other entry orifice for the introduction of at least one base component, and wherein the said at least one orifice for the introduction of at least one base component is also used as an exit orifice for the mixture of the active and base components.

9. The device according to claim 3, wherein the mixing device comprises a receptacle comprising at least one entry orifice for the introduction of at least one active component and at least one other entry orifice for the introduction of at least one base component, and wherein the said at least one orifice for the introduction of at least one base component is also used as an exit orifice for the mixture of the active and base components.

10. The device according to claim 4, wherein the mixing device comprises a receptacle comprising at least one entry orifice for the introduction of at least one active component and at least one other entry orifice for the introduction of at least one base component, and wherein the said at least one orifice for the introduction of at least one base component is also used as an exit orifice for the mixture of the active and base components.

11. The device according to claim 5, wherein the mixing device comprises a receptacle comprising at least one entry orifice for the introduction of at least one active component and at least one other entry orifice for the introduction of at least one base component, and wherein the said at least one orifice for the introduction of at least one base component is also used as an exit orifice for the mixture of the active and base components.

12. The device according to claim 6, wherein the mixing device comprises a receptacle comprising at least one entry orifice for the introduction of at least one active component and at least one other entry orifice for the introduction of at least one base component, and wherein the said at least one orifice for the introduction of at least one base component is also used as an exit orifice for the mixture of the active and base components.

* * * * *